United States Patent
Kim et al.

(10) Patent No.: US 9,319,674 B2
(45) Date of Patent: Apr. 19, 2016

(54) THREE-DIMENSIONAL IMAGE DISPLAY DEVICE AND DRIVING METHOD THEREOF

(75) Inventors: Tae-Wook Kim, Seoul (KR); JaeWoo Lee, Paju-si (KR); HyeJin Kim, Goyang-si (KR); Myung-Soo Park, Seoul (KR)

(73) Assignee: LG Display Co., Ltd., Seoul (KR)

( * ) Notice: Subject to any disclaimer, the term of this patent is extended or adjusted under 35 U.S.C. 154(b) by 423 days.

(21) Appl. No.: 13/443,139

(22) Filed: Apr. 10, 2012

(65) Prior Publication Data

US 2013/0044101 A1 Feb. 21, 2013

(30) Foreign Application Priority Data

Aug. 18, 2011 (KR) ........................ 10-2011-0082358

(51) Int. Cl.
| | |
|---|---|
| *G06T 15/00* | (2011.01) |
| *H04N 17/04* | (2006.01) |
| *H04N 21/422* | (2011.01) |
| *H04N 21/44* | (2011.01) |
| *H04N 21/442* | (2011.01) |
| *H04N 21/81* | (2011.01) |
| *H04N 13/04* | (2006.01) |
| *G09G 3/00* | (2006.01) |
| *G09G 3/20* | (2006.01) |

(52) U.S. Cl.
CPC ............... *H04N 17/04* (2013.01); *G09G 3/003* (2013.01); *G09G 3/20* (2013.01); *H04N 13/0404* (2013.01); *H04N 13/0409* (2013.01); *H04N 13/0425* (2013.01); *H04N 13/0477* (2013.01); *H04N 21/42202* (2013.01); *H04N 21/44* (2013.01); *H04N 21/44218* (2013.01); *H04N 21/816* (2013.01); *G09G 2320/0693* (2013.01)

(58) Field of Classification Search
USPC .......................................................... 345/419
See application file for complete search history.

(56) References Cited

U.S. PATENT DOCUMENTS

| | | | |
|---|---|---|---|
| 6,023,277 A | * | 2/2000 | Osaka et al. .................. 345/419 |
| 6,055,013 A | * | 4/2000 | Woodgate et al. .............. 348/59 |
| 6,762,789 B1 | | 7/2004 | Sogabe et al. |

(Continued)

FOREIGN PATENT DOCUMENTS

| | | |
|---|---|---|
| JP | H0954281 A | 2/1997 |
| KR | 20030021293 A | 3/2003 |

(Continued)

OTHER PUBLICATIONS

Hill et al. "3-D Liquid Crystal Displays and Their Applications", IEEE, 2006.*

*Primary Examiner* — Kimbinh T Nguyen
(74) *Attorney, Agent, or Firm* — Morgan, Lewis & Bockius LLP

(57) ABSTRACT

Disclosed are a 3D image display device and a driving method thereof. The 3D image display device includes a panel, a barrier panel, an image collector, and a timing controller. The panel includes a plurality of left-eye pixels and right-eye pixels. The barrier panel is disposed at a front surface of the panel, and includes a light transmitting area and a light blocking area. The image collector collects images of an object. The timing controller sets and stores a view map with the images in a view map correction mode and, in a 3D viewing mode, determines which of a plurality of viewing zones for a 3D image the object is located in and generates a barrier control signal for driving the barrier panel according to the determined result.

21 Claims, 5 Drawing Sheets

(56) References Cited

U.S. PATENT DOCUMENTS

| | | | |
|---|---|---|---|
| 6,888,540 B2 * | 5/2005 | Allen | 345/419 |
| 7,375,728 B2 * | 5/2008 | Donath et al. | 345/427 |
| 8,144,079 B2 * | 3/2012 | Mather et al. | 345/32 |
| 8,159,739 B2 * | 4/2012 | Woodgate et al. | 359/290 |
| 8,648,876 B2 * | 2/2014 | Yoshifuji et al. | 345/619 |
| 2009/0271732 A1 | 10/2009 | Kondo et al. | |
| 2011/0316987 A1 * | 12/2011 | Komoriya et al. | 348/51 |
| 2012/0019529 A1 * | 1/2012 | Kimpe | 345/419 |

FOREIGN PATENT DOCUMENTS

| | | |
|---|---|---|
| KR | 10-2008-0070497 A | 7/2008 |
| KR | 10-2010-0009739 A | 1/2010 |
| WO | 2008030005 A1 | 3/2008 |

* cited by examiner

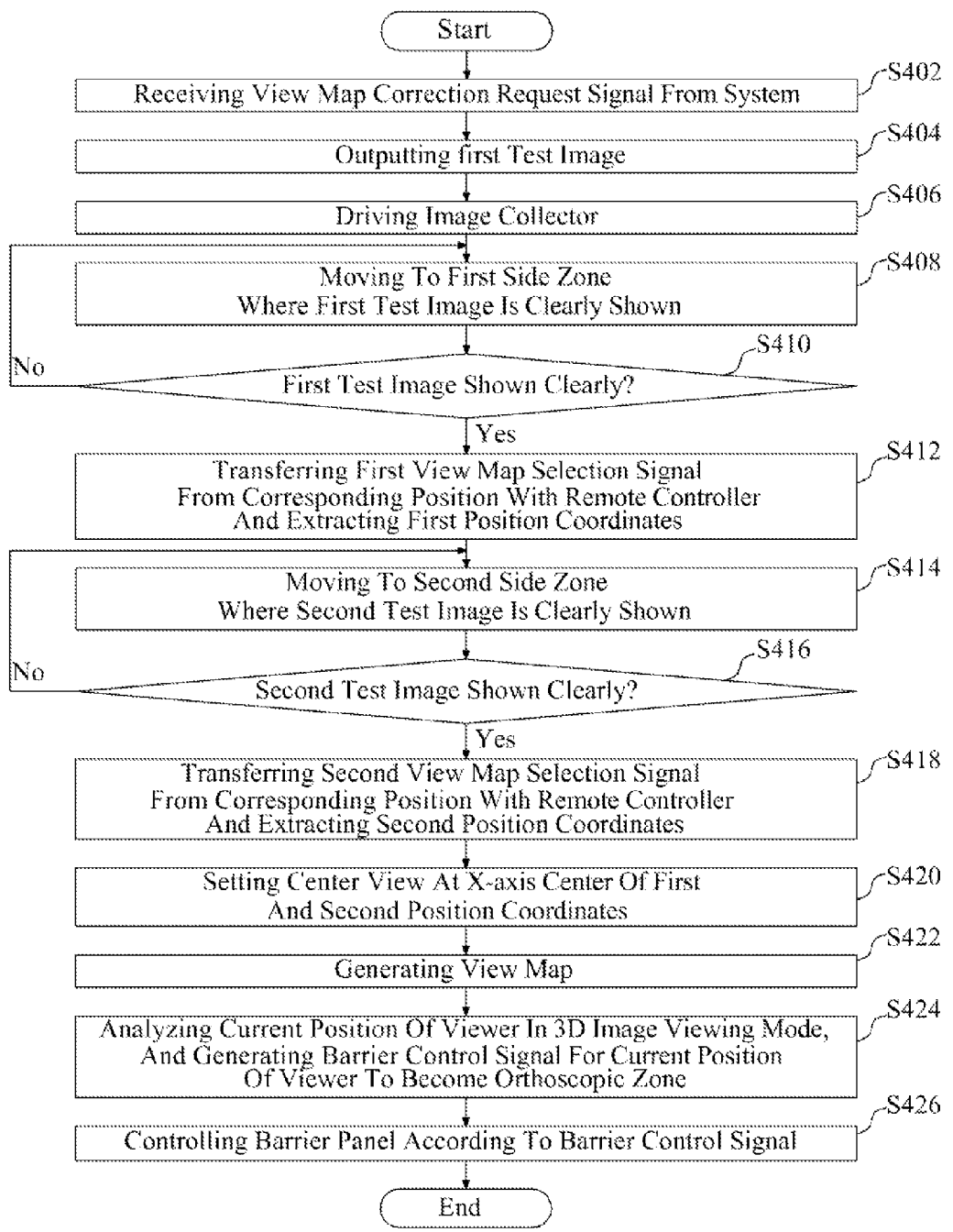

THREE-DIMENSIONAL IMAGE DISPLAY DEVICE AND DRIVING METHOD THEREOF

CROSS-REFERENCE TO RELATED APPLICATIONS

This application claims the benefit of the Korean Patent Application No. 10-2011-0082358 filed on Aug. 18, 2011, which is hereby incorporated by reference as if fully set forth herein.

BACKGROUND

1. Field of the Invention

The present invention relates to a display device, and more particularly, to a Three-Dimensional (3D) image display device and a driving method thereof, which display an image three-dimensionally.

2. Discussion of the Related Art 3D image display devices three-dimensionally display an image with characteristic where perspective is given in combining different image signals discerned by two eyes.

Such a 3D image display technique is largely categorized into a stereoscopic technique, a volumetric technique, and a holographic technique.

Among these techniques, the stereoscopic technique is again categorized into a glasses technique and a glassesless technique. Recently, the glassesless technique is being actively researched.

The glassesless technique is again categorized into a lenticular lens technique and a parallax barrier technique using a parallax barrier.

Recently, as disclosed in Korea Patent Application No. 10-2008-0070497, a method is being developed where a display device tracks a viewer's motion through eye-tracking, and varies the image transmission effect of a barrier panel according to the tracked position of the viewer, thereby enabling the viewer to watch a 3D image from an orthoscopic zone even when moving from a current position to another position.

FIG. 1 is an exemplary diagram for describing a state where a related art 3D image display device is using an eye-tracking scheme.

In a related art 3D image display device 10, a barrier panel including a parallax barrier or a lenticular lens is disposed in the front of a panel in a sheet type or the like, and thus respectively supplies different images to a user's left and right eyes to realize a 3D image.

FIG. 1 illustrates the 3D image display device 10 that displays a 3D image with nine views, and particularly illustrates a 3D image display device including a barrier panel where light transmission characteristic varies according to a voltage application scheme. Herein, for example, the barrier panel is configured with a liquid crystal electric field lens, and includes a switchable liquid crystal lens or a switchable barrier where a light transmitting direction varies according to the voltage application scheme.

The related art 3D image display device 10 of FIG. 1 tracks a viewer's position with an image collector 20 for eye-tracking, changes a voltage application scheme for the barrier panel to vary the light transmission characteristic of the barrier panel according to the tracked position of the viewer, and thus allows the tracked position to correspond to an orthoscopic zone, thereby enabling the viewer to view a normal 3D image.

Such an eye-tracking glassesless 3D image display device checks a view formed at the center thereof, thereby detecting a difference between a center point detected by the 3D image display device and a center point discerned by the viewer.

A method, which detects the difference between the center point detected by the 3D image display device and the center point discerned by the viewer, is performed through an operation where a measurer (manufacturer) directly measures the number of a corresponding view measured from the center point to check a view number in the center, namely, the number of center views, at a stage of manufacturing a 3D image display device.

A view map created by the method is predetermined as certain relative positions from the 3D image display device, in which case the position of the center view (being the center point) is also predetermined. Therefore, when a viewer actually watches 3D images displayed by the 3D image display device, the 3D image display device varies the light transmission characteristic of the barrier panel according to the viewer's position, by using the viewer's position coordinates tracked by the image collector and the view map predetermined through the operation. Accordingly, viewers can watch normal 3D images from an orthoscopic zone at any time.

SUMMARY

Accordingly, the present invention is directed to provide a 3D image display device and a driving method thereof that substantially obviate one or more problems due to limitations and disadvantages of the related art.

An aspect of the present invention is directed to provide a 3D image display device and a driving method thereof, which output two test images to receive two view selection signals and set a new view map by using coordinates of a position from which the two view selection signals are received and the number of views for a panel, in a view map correction mode, and control a barrier panel to switch the position of an orthoscopic zone by using a view map and position coordinates extracted from an image, in a 3D viewing mode.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a 3D image display device including: a panel including a plurality of left-eye pixels and right-eye pixels; a barrier panel disposed at a front surface of the panel, and including a light transmitting area and a light blocking area for transmitting or blocking a left-eye image and a right-eye image which are respectively outputted from the left-eye pixel and the right-eye pixel; an image collector collecting images of an object; and a timing controller setting and storing a view map with the images in a view map correction mode and, in a 3D viewing mode, determining which of a plurality of viewing zones for a 3D image the object is located in and generating a barrier control signal for driving the barrier panel according to the determined result.

In another aspect of the present invention, there is provided a 3D image display device including: a panel including a plurality of left-eye pixels and right-eye pixels; a barrier panel disposed at a front surface of the panel, and including a light transmitting area and a light blocking area for transmitting or blocking a left-eye image and a right-eye image which are respectively outputted from the left-eye pixel and the right-eye pixel; an image collector collecting images of an object; an image data alignment unit realigning video data suitably for the panel to output image data, the video data being received from a system; a position determination unit extracting position coordinates of the object from the images; and a control unit outputting a test image to the panel, generating and storing a view map by using a plurality of view selection signals received from the system and the position coordinates of the object extracted by the position determination unit when the view selection signals are received from the system, in the view map correction mode and, in the 3D image viewing mode, determining which of a plurality of viewing zones for a 3D image current position coordinates of the object correspond to using the current position coordinates and the view map and generating the barrier control signal for driving the barrier panel according to the determined result.

In another aspect of the present invention, there is provided a driving method of a 3D image display device including: outputting a first test image, generated with a first view, onto a panel, receiving a first view selection signal from a system, and extracting first position coordinates of an object in the middle of receiving the first view selection signal, when a view map correction mode is selected; outputting a second test image, generated with the first view, onto a panel, receiving a second view selection signal from the system, and extracting second position coordinates of the object in the middle of receiving the second view selection signal, when the first view selection signal is received; generating a view map with the first and second position coordinates to store the view map, the view map including coordinates of a plurality of orthoscopic zones which are formed with a 3D image including at least two or more views; and controlling a barrier panel by using current position coordinates of the object and the view map such that the current position coordinates correspond to an orthoscopic zone, when a 3D image viewing mode is selected, the current position coordinates being extracted from images which are collected by an image collector.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 is a flowchart illustrating a driving method of a 3D image display device, according to an embodiment of the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
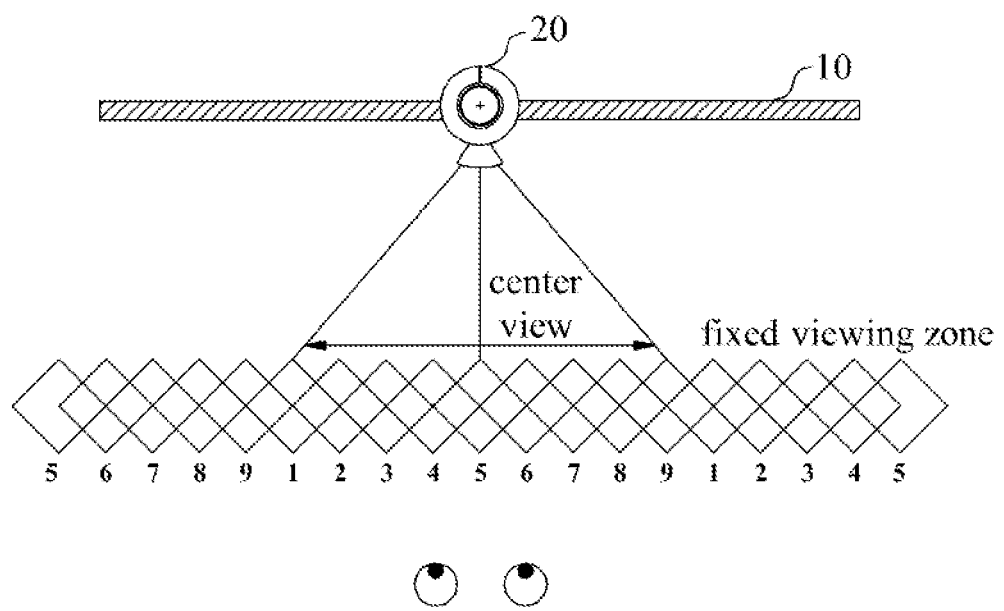
FIG. 1 is an exemplary diagram for describing a state where a related art 3D image display device is using an eye-tracking scheme.
Figure 2:
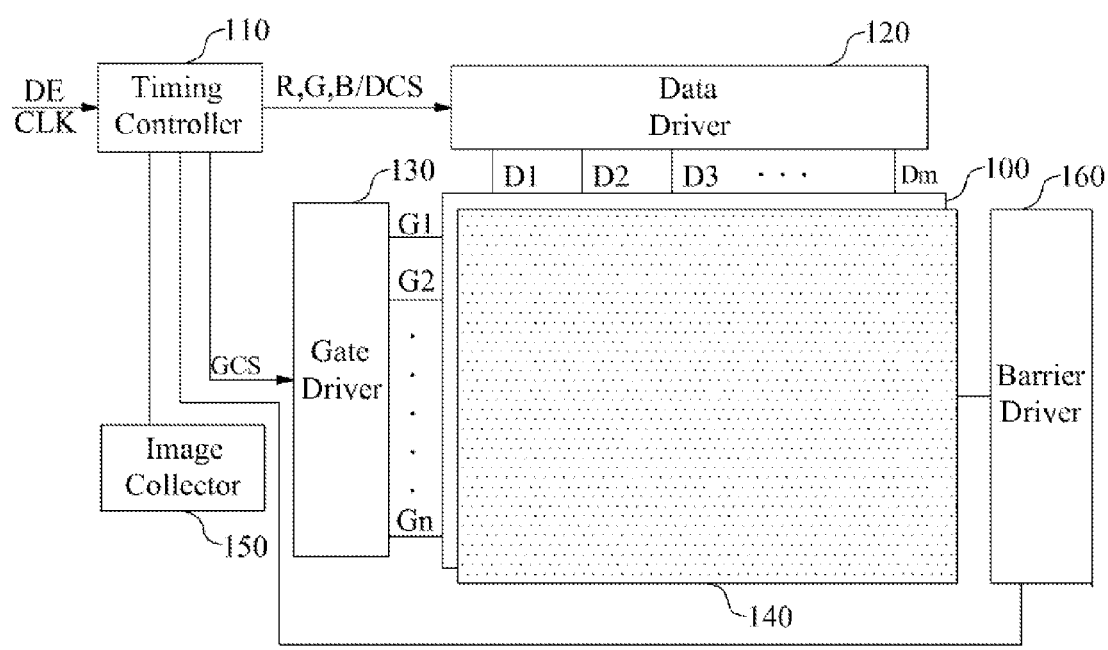
FIG. 2 is an exemplary diagram illustrating a configuration of a 3D image display device according to an embodiment of the present invention.

FIG. 2 is an exemplary diagram illustrating a configuration of a 3D image display device according to an embodiment of the present invention.

The 3D image display device according to an embodiment of the present invention enables a viewer (which is viewing a glassesless 3D image display device using eye-tracking) to directly set and store a view map that includes coordinates information on an orthoscopic zone and pseudoscopic zone of the 3D image display device.

Figure 3:
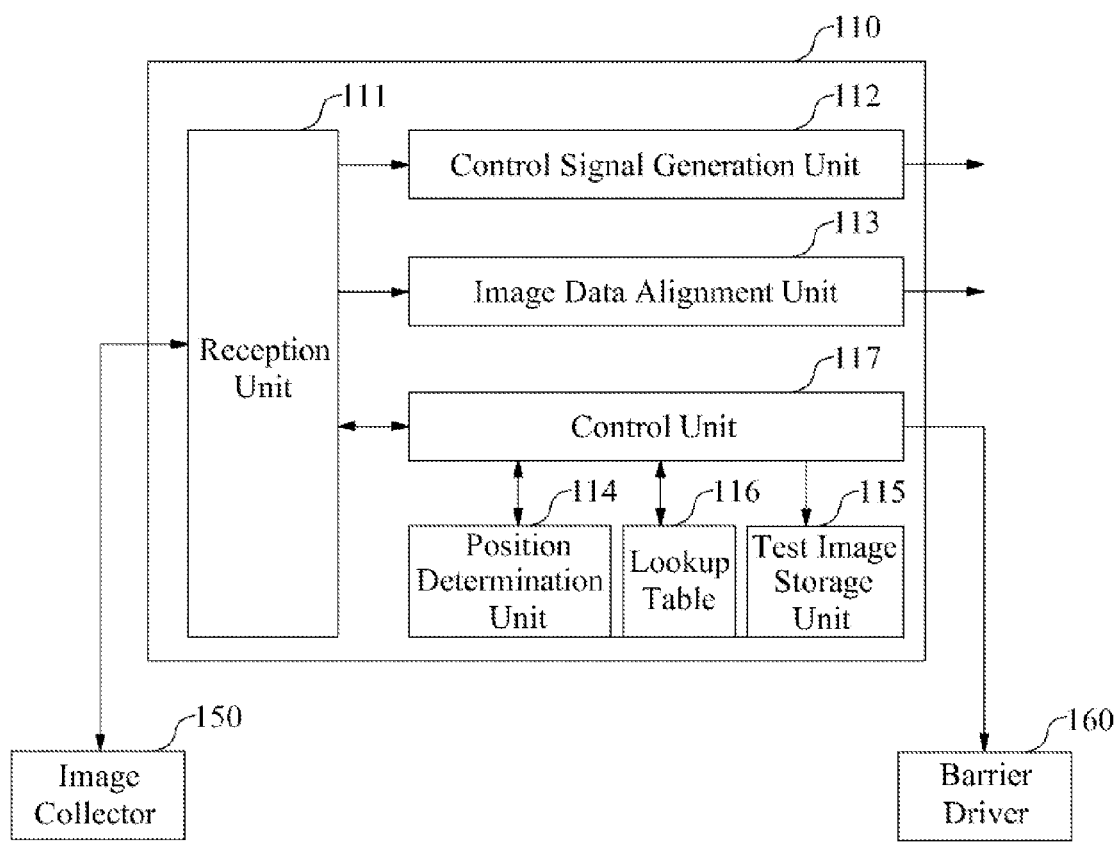
FIG. 3 is an exemplary diagram illustrating an internal configuration of a timing controller of a 3D image display device, according to an embodiment of the present invention.

For this end, as illustrated in FIG. 3, the 3D image display device according to an embodiment of the present invention includes: a panel 100 where a plurality of left-eye pixels and right-eye pixels are formed; a barrier panel 140 that is disposed at a front surface of the panel 100, and includes a light transmitting area and a light blocking area for transmitting or blocking a left-eye image and a right-eye image which are respectively outputted from a left-eye pixel and a right-eye pixel; an image collector 150 that collects images of an object through eye-tracking; a timing controller 110 that sets and stores a view map with the images collected by the image collector 150 in a view map correction mode and, in a 3D viewing mode, determines which of viewing zones for 3D images the object is located in using the images collected by the image collector 150 and generates a barrier control signal for driving the barrier panel 140 according to the determined result; a gate driver 130 that sequentially applies a scan pulse to a plurality of gate lines formed in the panel 100; a data driver 120 that applies digital image data (RGB) signals to a plurality of data lines formed in the panel 100, respectively; and a barrier driver 160 that drives the barrier panel 140 to switch between the orthoscopic zone and the pseudoscopic zone according to the control of the timing controller 110.

The 3D image display device according to the present embodiment may be implemented as a flat panel display device such a Liquid Crystal Display (LCD), an Field Emission Display (FED), a Plasma Display Panel (PDP), Electroluminescence device (EL), or an Electrophoresis Display (EPD). However, for convenience of a description, the LCD will be described below as an example of the present invention.

The panel 100 may be implemented in various types according to the type of a display device. For example, the panel 100 may be a liquid crystal display panel, a plasma display panel, an organic light emitting display panel, or an electrophoresis display panel. Hereinafter, for convenience of a description, the liquid crystal display panel will be described as an example of the panel 100.

A plurality of pixels for displaying red, green, and blue (RGB) are formed in the panel 100. The pixels are divided into a plurality of left-eye pixels that display a left-eye image and a plurality of right-eye pixels that display a right-eye image, for displaying 3D images in operational connection with the barrier panel 140.

The timing controller 110 receives a timing signal (including a data enable signal DE, a dot clock CLK, etc.) to generate a plurality of control signals DCS and GCS for respectively controlling the operation timings of the data driver 120 and the gate driver 130.

The control signal GCS for controlling the gate driver 130 includes a gate start pulse (GSP), a gate shift clock (GSC), a gate output enable signal (GOE), and a shift direction control signal (DIR). The control signal DCS for controlling the data driver 120 includes a source sampling clock (SSC), a polarity control signal (POL), and a source output enable signal SOE).

In the view map correction mode, The timing controller 110 according to an embodiment of the present invention outputs a test image to the panel 100, and generates and stores a view map by using a plurality of view selection signals received from a system and position coordinates that are extracted by a position determination unit (114 in FIG. 3) when the view selection signals are received. In the 3D image viewing mode, the timing controller 110 determines which of viewing zones for 3D images an object is located in using the view map and the current position coordinates and of the object, and generates the barrier control signal for driving the barrier panel 140 according to the determined result. The function of the timing controller 110 will be below described in detail with reference to FIG. 3.

Hereinafter, as illustrated in FIG. 3, the timing controller 110 will be described as including elements for realizing a driving method of the 3D image display device according to an embodiment of the present invention, but the present embodiment is not limited thereto. In addition to the timing controller 110, a separate controller that includes a reception unit 111, a position determination unit 114, a lookup table 116, a test image storage unit 115, and a control unit 117 may realize the function of the present invention, and may be included in a 3D image display device. However, in the below description of the present invention, for convenience of a description, the timing controller 110 will be described as including the elements.

The data driver 120 includes a plurality of data drive Integrated Circuits (ICs), and latches digital image data RGB according to the control of the timing controller 110. Furthermore, by converting the digital image data RGB into a plurality of analog positive/negative gamma compensation voltages, the data driver 120 generates a plurality of analog positive/negative pixel voltages and respectively supplies the pixel voltages to a plurality of data lines D1 to Dm.

The gate driver 130 includes one or more gate drive ICs, and sequentially supplies a scan pulse (gate pulse) to a plurality of gate lines G1 to Gn.

The barrier panel 140 includes the light transmitting area and the light blocking area for transmitting or blocking a left-eye image outputted from a left-eye pixel and a right-eye image outputted from a right-eye pixel. The barrier panel 140 switches between the light transmitting area and the light blocking area according to the application order of voltages from the barrier driver 160 or the levels of the voltages, thereby switching the position of the orthoscopic zone that enables the viewing of 3D images.

The barrier panel 140 may be variously configured using a liquid crystal electric field lens disclosed in Korea Patent Application No. 10-2008-0070497 and technologies that have been known to those skilled in the art.

The barrier panel 140, for example, may be configured with the liquid crystal electric field lens or the like, and configured with a switchable liquid crystal lens or a switchable barrier where a light transmitting direction varies according to a voltage application method.

Various types of barrier panels that have been known to those skilled in the art may also be applied to the present invention. The feature of the present invention is not limited to the configuration itself of the barrier panel, and thus, a description on the barrier panel 140 will not be provided below.

The barrier driver 160, as described above, drives the barrier panel 140 to switch between the light transmitting area and the light blocking area that are formed in the barrier panel 140. The barrier driver 160 may be configured using technologies that have been known to those skilled in the art.

In the 3D image viewing mode, the barrier driver 160 applied to the present invention controls the barrier panel 140 according to a barrier control signal that is transferred from the timing controller 110.

The image collector 150 is built in the 3D image display device according to the present embodiment. The image collector 150 collects images of an object (viewer) that is located at a distance from the 3D image display device, and transfers the collected images of the object (viewer) to the timing controller 110.

That is, the image collector 150 collects images of a viewer (object) that is watching 3D images on the 3D image display device according to the present embodiment. The collected images are transferred to and analyzed by the timing controller 110, and thus, the position coordinates of the viewer are extracted from the images.

A camera may be used as the image collector 150, but the image collector 150 may use an infrared sensor that determines a position using infrared light.

Figure 4:
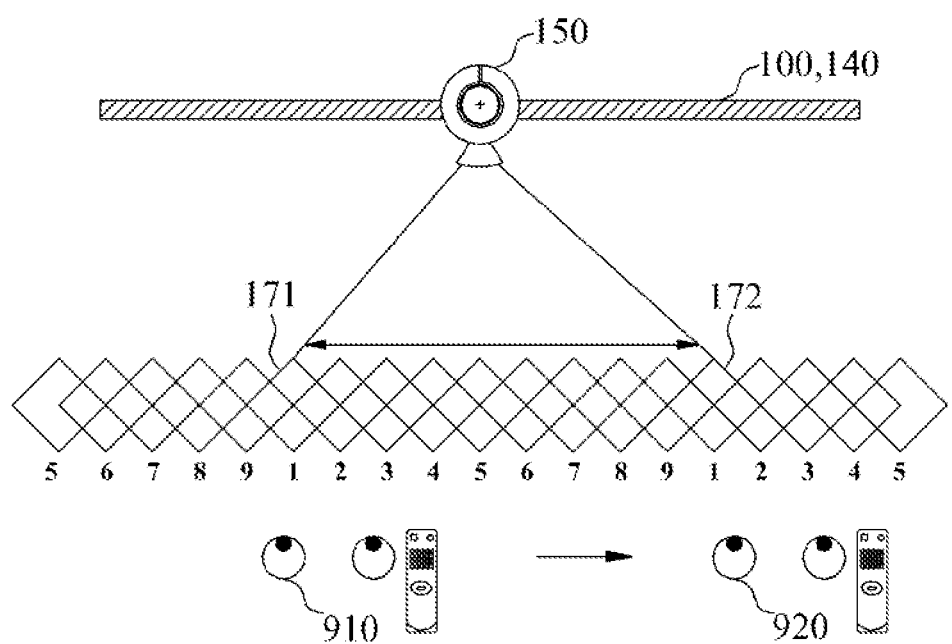
FIG. 4 is an exemplary diagram illustrating a viewing zone displayed as nine views for describing a driving method of a 3D image display device, according to an embodiment of the present invention.

FIG. 3 is an exemplary diagram illustrating an internal configuration of the timing controller of the 3D image display device, according to an embodiment of the present invention. FIG. 4 is an exemplary diagram illustrating a viewing zone displayed as nine views for describing the driving method of the 3D image display device, according to an embodiment of the present invention, and illustrates a viewing zone that is displayed with image data including the nine views.

Referring to FIG. 3, the timing controller 110 applied to the present embodiment includes: a reception unit 111 that receives video data and various timing signals (DE, CLK, etc.) from a broadcasting system; a control signal generation unit 112 that generates a control signal with the timing signals transferred from the reception unit 111, and outputs the control signal; an image data alignment unit 113 that realigns the video data, transferred from the reception unit 111, to be suitable for the characteristic of the panel 100 and outputs the realigned image data; a position determination unit 114 that extracts the position coordinates of an object from the images collected by the image collector 150; a control unit 117 that outputs a test image to the panel, and then generates and stores a view map by using a plurality of view selection signals received from the system and the position coordinates of the object extracted by the position determination unit 114 when the view selection signals are received from the system, in the view map correction mode, and determines which of viewing zones for 3D images the object is located in using the position coordinates of the object and the view map and generates the barrier control signal for driving the barrier panel 140 according to the determined result, in the 3D image viewing mode; a lookup table 116 that stores view maps; and a test image storage unit 115 that stores test images.

The reception unit 111, as described above, receives the video data and the timing signal, transfers the timing signal to the control signal generation unit 112, and transfers the video data to the image data alignment unit 113.

The control signal generation unit 112, as described above, generates the control signals GCS and DCS for respectively controlling the gate driver 130 and the data driver 120 with the timing signal transferred from the reception unit 111.

The image data alignment unit 113 realigns the received video data to be suitable for the characteristic of the panel 100, and transfers the aligned image data to the data driver 120.

Moreover, the image data alignment unit 113 may transfer test images, which are transferred from the test image storage unit 115 through the control unit 117, to the data driver 120.

However, the control unit 117 may directly transfer the test images to the data driver 120, in which case the image data alignment unit 113 may not transfer the image data to the data driver 120 according to an output stop control signal received from the control unit 117.

The position determination unit 114 extracts the position coordinates of a viewer that is watching 3D images on the 3D image display device according to the present embodiment, by using images collected by the image collector 150.

The following description will be made on a method where the position determination unit 114 determines the position coordinates of a viewer by using images collected by the image collector 150.

By scanning the image collector 150 in a direction from the left to the right or from the right to the left of the 3D image display device, the position determination unit 114 or control unit 117 of the timing controller 110 may obtain width information (W_person, X coordinate) of an object (viewer) that is located in the front of the 3D image display device, and analyze the reflection time of infrared light to obtain distance information (D_person, Y coordinate) of the object (viewer).

Particularly, the position coordinates (X,Y) of an object (viewer) may be defined as expressed in Equation (1) below.

$$(X,Y)=\{(W1+W2)/2, D\_person\} \quad (1)$$

For the above-described determination, the image collector 150 may move in a left and right direction or an upward and downward direction by a driver (not shown). The position determination unit 114 or the control unit 117 may control the driver to control the position or angle of the image collector 150, and thus, as described above, enable the image collector 150 to collect images through scanning.

When a camera is used as the image collector 150, X coordinate may be determined by a face detecting scheme, and Y coordinate may be determined using disparity information of a stereo camera or depth information of a depth camera.

That is, when a camera is used as the image collector 150, the position determination unit 114 may determine the X coordinate of a viewer in a scheme that detects the face of the viewer from images collected by the camera. Such a face detecting scheme may apply a general scheme, and thus, its detailed description is not provided.

Moreover, when a camera is used as the image collector 150, a stereo camera or a depth camera is applied as the camera, and thus, the Y coordinate of an object (viewer) may be determined using information collected by the stereo camera or the depth camera.

The lookup table 116 stores a view map that is generated by the control unit 117.

In the present embodiment, the view map denotes coordinates information of a viewing zone that enables the viewing of 3D images displayed on the 3D image display device. The viewing zone is divided into an orthoscopic zone, a pseudoscopic zone, and an invisible zone.

The orthoscopic zone is a zone that enables a viewer to normally watch 3D images, and denotes a zone where a right-eye image is transferred to the viewer's right eye and a left-eye image is transferred to the viewer's left eye.

In the pseudoscopic zone, since disparity information of an image is transferred, a viewer discerns images three-dimensionally. However, the pseudoscopic zone is a zone where a left-eye image is transferred to the viewer's right eye and a right-eye image is transferred to the viewer's left eye, and thus, the viewer's eyes feel fatigue more rapidly in the pseudoscopic zone.

The invisible zone is a zone that disables a viewer to watch the viewing of 3D images.

The view map includes coordinates information on positions where the three zones are displayed.

However, all zones other than the orthoscopic zone and pseudoscopic zone can be determined as the invisible zone, and thus, the view map may not include coordinates information on the invisible zone.

When the position coordinates of an object determined by the position determination unit 114 are not included in a coordinate zone corresponding to the orthoscopic zone or pseudoscopic zone where the position coordinates are included in a view map, the control unit 117 may determine a corresponding zone as the invisible zone.

As the number of views applied to the panel 100 increases, the orthoscopic zone, the pseudoscopic zone, and the invisible zone are more complicated and diversified.

That is, the control unit 117 cannot generate a view map by using only the position coordinates of images collected by the image collector 150. The control unit 117 can generate a view map by integratedly using the number of views displayed on the panel 100, the size of the panel 100, the pitch of each pixel formed in the panel 100, and the characteristic of the barrier panel 140.

Accordingly, the lookup table 116 may store various information that the control unit 117 refers to for generating a view map, for example, may further store at least one of: the number of views displayed on the panel 100; the size of the panel 100; the pitch of each pixel formed in the panel 100; and the characteristic of the barrier panel 140.

The test image storage unit 115 stores test images that are displayed on the panel 100, in the view map correction mode.

The test image may be a first test image that is viewed only in a first orthoscopic zone (one of orthoscopic zones included in the viewing zone) in a one side direction from the front center of the 3D image display device, and a second test image that is viewed only in the first orthoscopic zone (one of orthoscopic zones included in the viewing zone) in the other side direction from the front center.

As illustrated in FIG. 4, when the 3D image display device of the present embodiment is assumed as displaying images with nine views, a first orthoscopic zone 171 formed by a first view is disposed within a distance leftward from a center direction a camera indicates, and a second orthoscopic zone 172 formed by the first view is disposed within a distance rightward from the center direction. Accordingly, the 3D image display device of the present embodiment stores and uses test images by using the first view that is shown in the first orthoscopic zone and the second orthoscopic zone.

Therefore, if the positions of the first and second orthoscopic zones formed by the first view are determined, the intermediate position of X coordinates of the first and second orthoscopic zones may be designated as the X coordinate of a center view.

Herein, as described above, the first and second test images are images, which are displayed on the panel 100 by the first view, among images displayed by first to nth views. The first and second test images may be the same type of images or different types of images.

However, when a viewer designates a first orthoscopic zone with the first test image and then switches a position for searching the second orthoscopic zone, the first and second test images may be outputted as different images for informing the viewer of a need for position switching for the search of the second orthoscopic zone.

For example, the first test image for the search of the first orthoscopic zone is displayed as 1, and the second test image for the search of the second orthoscopic zone is displayed as 2.

When a current mode is switched into the view map correction mode, the control unit 117 may display 1 that is the first test image for the search of the first orthoscopic zone. When a first view selection signal is received from a user side, the control unit 117 may display the second test image displayed as 2 for the search of the second orthoscopic zone.

In the view map correction mode, the control unit 117 sequentially outputs the first and second test images, stored in the test image storage unit 115, to receive the first view selection signal and a second view selection signal, and calculates an intermediate position between the first and second orthoscopic zones as the position of the center view by using the position coordinates of a user (object) when the view selection signals are received. That is, the control unit 117 calculates the position coordinates of the center view with a ½ point of the X coordinates of the first and second orthoscopic zones as the X coordinate of the center view and with a ½ point of the Y coordinates of the first and second orthoscopic zones as the Y coordinate of the center view.

The control unit 117 generates the coordinates of a plurality of orthoscopic zones that are illustrated in FIG. 4, by integratedly using the center view, the number of views displayed on the panel 100, the size of the panel 100, the pitch of each pixel formed in the panel 100, and the characteristic of the barrier panel 140. The control unit 117 generates a view map including coordinates information on orthoscopic, pseudoscopic, and invisible zones by using the generated coordinates, and stores the view map in the lookup table 116.

When the view map is stored in the lookup table 116 in the view map correction mode and then a current mode is switched into the 3D image viewing mode, the control unit 117 determines which of orthoscopic, pseudoscopic, and invisible zones the current position coordinates of a viewer correspond to using the view map and the current position coordinates of the viewer collected by the image collector 150.

When the determined result shows that the current position coordinates correspond to the orthoscopic zone, the control unit 117 analyzes the view map and the current position coordinates of the viewer to generate a barrier control signal that allows the current position coordinates of the viewer to correspond to the orthoscopic zone, and transfers the barrier control signal to the barrier driver 160.

In the 3D image viewing mode, the control unit 117 controls the barrier driver 160 such that the current position coordinates of a user always correspond to an orhtoscopic zone.

Hereinafter, a driving method of the 3D image display device according to an embodiment of the present invention will be described in detail with reference to FIGS. 3 to 5.

FIG. 5 is a flowchart illustrating a driving method of the 3D image display device, according to an embodiment of the present invention.

Left and right images, namely, images of two views are required to be respectively transferred to a left eye and a right eye so as to enable a viewer to recognize an image, outputted from the 3D image display device, as a 3D image. However, in glassesless 3D image display devices using no special 3D image glasses, a zone enabling the viewing of 3D images is limited to a light path, and thus, image contents composed of a plurality of views are required for expanding a viewing zone.

As the number of views increases, a zone enabling the viewing of 3D images is expanded. The number of views is predetermined by a manufacturer for the 3D image display device. Hereinafter, as illustrated in FIG. 4, a case where the 3D image display device of the present embodiment uses nine views will be described as an example of the present invention.

A viewing zone is relevant to the position of a viewer that is watching 3D images, and may be divided into the following three kinds of zones.

A first viewing zone is a position suitable for the viewer watching 3D images, and is an orthoscopic zone where a left-eye image is transferred to the viewer's left eye and a right-eye image is transferred to the viewer's right eye.

A second viewing zone is a position where the viewer feels three-dimensionality but cannot watch 3D images, and is a pseudoscopic zone where the right-eye image is transferred to the viewer's left eye and the left-eye image is transferred to the viewer's right eye.

A third viewing zone is a position that disables the viewer to watch 3D images, and is an invisible zone where combined left and right images are transferred to eyes or the viewer cannot watch 3D images itself.

To watch 3D images displayed on the 3D image display device, the viewer is required to be located in the orthoscopic zone where 3D images are accurately realized.

However, it is not easy for a viewer to accurately find the orthoscopic zone. Therefore, the 3D image display device of the present embodiment includes a function of automatically switching between the light transmitting area and the light blocking area of the barrier panel 140, in order for the viewer's position to become the orthoscopic zone always. Particularly, in order for the switching to be performed more accurately, the 3D image display device of the present embodiment allows a viewer to directly set a view map that includes information of a reference point (position coordinates of a center view, etc.) for the switching.

For this end, the driving method of the 3D image display device according to the present embodiment may be greatly performed in four stages as follows.

A first stage includes operations S402 to S412 where when the view map correction mode is selected, the first test image generated with the first view is outputted by the panel 100, the first view selection signal is received from the system, and first position coordinates of an object are extracted in the middle of receiving the first view selection signal.

A second stage includes operations S414 to S418 where when the first view selection signal is received, the second test image generated with the first view is outputted by the panel 100, the second view selection signal is received from the system, and second position coordinates of an object are extracted in the middle of receiving the second view selection signal.

A third stage includes operations S420 and S422 that generate and store a view map having the coordinates of orthoscopic zones which are formed according to a 3D image having at least two or more views, by using first and second position coordinates.

A fourth stage includes operations S424 and S426 where when the 3D image viewing mode is selected, the barrier panel 140 is controlled in order for the current position coordinates of the object to correspond to an orthoscopic zone, by using the current position coordinates of the object collected and extracted by the image collector 150 and the view map generated through the operations.

Hereinafter, the above-described four stages of the present embodiment will be described in detail with reference to FIGS. 3 to 5.

First, in the detailed operations of the first stage, the control unit 117 of the timing controller 110 receives a view map correction request signal from the system in operation S402.

The view map correction request signal is initially received when the 3D image display according to the present embodiment has been turned on, when a 3D image is being outputted, or when a Two-Dimensional (2D) image is being outputted.

That is, a viewer that is watching images displayed on the 3D image display device of the present embodiment may select a view map correction request menu that is disposed at a case of the 3D image display device or a remote controller. In this case, the view map correction request signal is received through the system by the control unit 117 that is included in the timing controller 110 or a separate device for implementing the driving method of the 3D image display device according to the present embodiment.

At this point, the control unit 117 outputs the first test image, stored in the test image storage unit 115, through the first test image in operation S404.

Herein, the first test image is generated with the first view of two or more views that are used by the 3D image display device according to the present embodiment.

That is, at least two or more views are required for displaying a 3D image. Information corresponding to each pixel is extracted from the two or more views, thereby generating one screen that is displayed during one frame. For example, the 3D image display device of the present embodiment uses the first test image that is generated with the first view, and moreover uses the second test image that is generated with the first view.

The reason, as illustrated in FIG. 4, is because the center view is disposed at an intermediate position between first orthoscopic zones (which are formed with the first view) with respect to right and left sides from the center of the panel 100, in forming the viewing zone of the 3D image display device. Therefore, when the center view is disposed at an intermediate position between orthoscopic zones which are formed with an nth view, the first and second test images may be generated with the nth view.

While the first test image is outputted by the panel 100, the control unit 117 disallows the image data alignment unit 113 to output video data (transferred from the system) to the data driver 120.

In the view map correction mode, the output of the test image is required, and thus, the control unit 117 may stop the driving of the image data alignment unit 113, transfer the test image directly to the data driver 120 or block video data inputted from the system to the image data alignment unit 113, and transfer the test image to the image data alignment unit 113, thereby allowing the test image from the image data alignment unit 113 to the data driver 120.

While the first test image is outputted, the control unit 117 drives the image collector 150 and thus allows the image collector 150 to collect images of the object in operation S406.

When the view map correction request signal is generated by a viewer side (being a remote controller or the like) and then the first test image is outputted by the panel 100, the viewer moves from a position (which is determined as the approximate center position of the 3D image display device) to a first side direction 910 (for example, a left direction in FIG. 4) in operation S408, and simultaneously determines whether the first test image is clearly shown in operation S410.

The viewer side transfers the first view map selection signal from a position (where the first test image is determined as clearly being shown) to the 3D image display device by using the first view map selection menu included in a remote controller or the like in operation S412. When the first view map selection signal is received, the control unit 117 stores the current position coordinates of the viewer side, extracted by the position determination unit 114, as first position coordinates.

In detailed operations of the second stage, when the first view selection signal is selected through the above-described operations, the control unit 117 outputs the second test image (which is generated with the first view) onto the panel 100, at which point the viewer moves to a second side direction 920 (for example, a right direction in FIG. 4) that is a direction opposite to the first side direction in operation S414 and simultaneously determines whether the second test image is clearly shown in operation S416.

The viewer side transfers the first view map selection signal from a position (where the second test image is determined as clearly being shown) to the 3D image display device by using a second view map selection menu included in the remote controller or the like in operation S418. When the second view map selection signal is received, the control unit 117 stores the current position coordinates of the viewer side, extracted by the position determination unit 114, as second position coordinates.

In detailed operations of the third stage, the control unit 117 extracts the X coordinate of the center view that is generated with a 3D image outputted from the 3D image display device, by using the first and second position coordinates that have been extracted through the above-described operations in operation S420.

When the image collector 150 is configured with an infrared sensor, an operation where the control unit 117 extracts the X coordinate of the center view may use the X-axis coordinate of the first position coordinates and the X-axis coordinate of the second position coordinates that are calculated by scanning the infrared sensor in a predetermined direction. Alternatively, when the image collector 150 is configured with a camera, the operation may use the X-axis coordinate of the first position coordinates and the X-axis coordinate of the second position coordinates that are calculated by the face detecting scheme.

In this case, the control unit 117 extracts the Y coordinate of the center view from images collected by the image collector 150. Herein, when the image collector 150 is configured with an infrared sensor, an operation where the control unit 117 extracts the Y-axis coordinate of the center view may use the Y-axis coordinate of the object that is calculated by analyzing the reflection time of infrared light outputted from the infrared sensor, or when the image collector 150 is configured with a camera, the operation may use the Y-axis coordinate of the object that is calculated with disparity information or depth information that is supplied by the camera.

That is, the center view denotes the position views of the center portion of the viewing zone of the 3D image display device, and becomes a reference point for the control unit 117 determining an orthoscopic zone. Therefore, the control unit 117 extracts the position coordinates of the center view through the above-described operations, thereby setting a determination reference for all orthoscopic zones.

Therefore, when the position coordinates of the center view are extracted through the above-described operations, the control unit 117 generates a view map including the coordinates of orthoscopic zones that are formed by the 3D image display device of the present embodiment, by using the position coordinates of the center view and at least one of: the number of views displayed on the panel 100; the size of the panel 100; the pitch of each pixel formed in the panel 100; and the characteristic of the barrier panel 140, and stores the view map in the lookup table 116 in operation S422.

The view map is generated by integratedly using the various information, with the center view as the reference point. The view map includes coordinates information on orthoscopic zones and pseudoscopic zones.

To provide an additional description, the view map includes the position coordinates of orthoscopic zones or pseudoscopic zones that are illustrated in FIG. 4.

When the generation of the view map that is used as reference information for determining an orthoscopic zone is completed through the above-described operations, a viewer can always watch 3D images, displayed on the 3D image display device of the present embodiment, from the orthoscopsic zone through the below-described final stage.

In detailed operations of the fourth stage, when the 3D image viewing mode is selected with a button that is disposed at an outer side of a remote controller of the 3D image display device, the control unit 117 drives the image data alignment unit 113 normally, and thus allows 3D images to be normally outputted with video data received from the system and extracts the current position coordinates of the object from images collected by the image collector 150 in operation S424.

At this point, the control unit 117 compares the extracted current position coordinates with the generated view map to determine whether the current position coordinates correspond to an orthoscopic zone. When the determined result shows that the current position coordinates do not correspond to the orthoscopic zone, the control unit 117 calculates the amount of change in the light transmitting area and light blocking area of the barrier panel 140 that allows the current position coordinates to correspond to the orthoscopic zone.

The control unit 117 generates the barrier control signal for controlling the barrier panel 140 according to the calculated amount of change, and transfers the barrier control signal to the barrier driver 160.

When current position coordinates do not correspond to an orthoscopic zone, the 3D image display device automatically controls the light transmitting area and light blocking area of the barrier panel 140, thereby allowing the current position coordinates to correspond to the orthoscopic zone. For this end, the 3D image display device compares the current position coordinates with the view map to approximately determine which position the current position coordinates correspond to.

When the determine result shows that a current position is not the orthoscopic zone, the control unit 117 determines an error between the current position coordinates and an orthoscopic zone with the view map, calculates the application scheme, application order, or levels of voltages (which will be applied to the barrier panel 140) for reducing the error, generates the barrier control signal on the basis of the calculated information, and transfers the barrier control signal to the barrier driver 160.

The barrier panel 140 switches the light transmitting area that transmits light outputted from the panel 100 and the light blocking area that blocks the light according to the application scheme, application order, or levels of voltages, thereby changing the position coordinates of an orthoscopic zone or the like. The control unit 117 generates the barrier control signal for switching the light transmitting area and the light blocking area, and transfers the barrier control signal to the barrier driver 160.

The barrier driver 160 receiving the barrier control signal changes the application scheme, application order, or levels of voltages (which will be applied to the barrier panel 140) to switch the light transmitting area and the light blocking area according to the barrier control signal, and thus allows the current position coordinates of the viewer to correspond to the orthoscopic zone in operation S426.

Various techniques that are used for switching the light transmitting area and the light blocking area may be applied to the barrier control signal, in a switchable barrier technique or a switchable liquid crystal lens technique.

A summary on the features of the present invention will now be described.

According to the present invention, in the eye-tracking glassesless 3D image display device, a viewer directly generates and uses the position coordinates of a center view that is used as reference information for determining an orthoscopic zone.

In the 3D image display device of the related art, a manufacturer directly measures various view numbers in a viewing zone, and directly checks and stores a center view number, namely, the number of center views and position coordinates.

On the contrary, in the present invention, a viewer that watches the eye-tracking glassesless 3D image display device can simply and directly check (calibrate) a center view that is formed at the center of the 3D image display device, and thus reduce an error of the center view that occurs between when manufacturing the 3D image display device and when viewing 3D images displayed on the 3D image display device, thereby enabling the viewer to watch the 3D images from a more accurate orthoscopic zone.

For this end, the 3D image display device of the present invention outputs an arbitrary pattern (first test image generated with a first view) that is clearly shown when a viewer is accurately located at the position of a 1view (left-eye 1view or right-eye 3view in FIG. 4) (in which case an orthoscopic zone is referred to as a first orthoscopic zone).

The viewer transmits a signal (first view selection signal) from a pattern-checked position to a system by using a remote controller, moves to the position of a 2view (second orthoscopic zone), and again transmits a signal (second view selection signal) from the moved position to the system by using the remote controller, whereupon the system determines the position of a center view and the width of a single viewing zone.

By dividing the length of the width by the number of views (nine in FIG. 4) that are used in the panel 100, the width and position of one view may be obtained.

The control unit 117 generates a view map suitable of the viewer and a viewing environment, on the basis of the obtained information.

To provide an additional description, in the eye-tracking glassesless 3D image display device, when the view map correction mode is executed, the panel 100 outputs a position check pattern (first test image). The pattern (first test image) is clearly shown when a viewer is in the position of a 2view accurately. The viewer transmits a specific flag signal (first view selection signal) to the system by using a remote controller.

Subsequently, the viewer moves in a right direction and again finds a position where the pattern (second test image) is clearly shown, and then transmits the same flag signal (second view selection signal) to the system by using the remote controller.

Then, the control unit 117 checks the width of a view map the viewer recognizes and, by dividing the length of the width by the number of views, determines the width of each view the viewer recognizes actually. Therefore, the position of the center view is automatically corrected.

That is, the 3D image display device of the present invention sets two reference points (first and second orthoscopic zones) with respect to the position of a viewer by using the position check pattern (first and second test images), and automatically generates the view map.

Subsequently, in the 3D image viewing mode, the control unit 117 determines whether the current position coordinates of the viewer (extracted by the image collector 150) correspond to an orthoscopic zone by using the view map, and when the current position coordinates do not correspond to the orthoscopic zone, the control unit 117 controls the barrier panel 140 such that the current position coordinates correspond to the orthoscopic zone.

According to the embodiments of the present invention, the 3D image display device outputs two test images to receive two view selection signals and sets a new view map by using the coordinates of a position from which the two view selection signals are received and the number of views for the panel, in the view map correction mode, and controls the barrier panel to switch the position of the orthoscopic zone by using the view map and position coordinates extracted from an image, in the 3D viewing mode, thus enhancing the viewing environment and image quality of glassesless 3D image display devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Three-Dimensional (3D) image display device, comprising:
    a panel comprising a plurality of left-eye pixels and right-eye pixels;
    a barrier panel disposed at a front surface of the panel, and comprising a light transmitting area and a light blocking area for transmitting or blocking a left-eye image and a right-eye image which are respectively outputted from the left-eye pixel and the right-eye pixel;
    an image collector collecting images of a user; and
    a controller setting and storing a view map with the images of the user in a view map correction mode that is selected by the user,
    wherein in a 3D viewing mode, the controller determines which of a plurality of viewing zones for a 3D image current position coordinates of the user correspond to using the view map set and stored in the view map correction mode that is selected by the user and the current position coordinates extracted by using the images collected by the image collector, and
    when a determined result shows that the current position coordinates do not correspond to an orthoscopic zone that is a comfortable zone for viewing the 3D image, the controller adjusts the barrier panel so that the current position coordinates correspond to the orthoscopic zone without a change in a physical position of the user.

2. The 3D image display device of claim 1, wherein when a view map correction request signal is received, the controller is switched to the view map correction mode, outputs a first test image viewable from a first orthoscopic zone to receive a first view selection signal, outputs a second test image viewable from a second orthoscopic zone to receive a second view selection signal, sets the view map with position coordinates from which the first and second view selection signals are received, and stores the view map.

3. A Three-Dimensional (3D) image display device, comprising:
    a panel comprising a plurality of left-eye pixels and right-eye pixels;
    a barrier panel disposed at a front surface of the panel, and comprising a light transmitting area and a light blocking area for transmitting or blocking a left-eye image and a right-eye image which are respectively outputted from the left-eye pixel and the right-eye pixel;
    an image collector collecting images of a user;
    an image data alignment unit realigning video data suitably for the panel to output image data, the video data being received from a system;
    a position determination unit extracting position coordinates of the user from the images of the user, the images of the user being collected by the image collector; and
    a control unit outputting a test image to the panel, generating and storing a view map by using a plurality of view selection signals received from the system and the position coordinates of the user extracted by the position determination unit when the view selection signals are received from the system, in a view map correction mode that is selected by the user,
    wherein in a 3D image viewing mode, the control unit determines which of a plurality of viewing zones for a 3D image current position coordinates of the user correspond to using the current position coordinates extracted by using the images collected by the image collector and the view map set and stored in the view map correction mode that is selected by the user, and
    when a determined result shows that the current position coordinates do not correspond to an orthoscopic zone that is a comfortable zone for viewing the 3D image, the controller adjusts the barrier panel so that the current position coordinates correspond to the orthoscopic zone without a change in a physical position of the user.

4. The 3D image display device of claim 3, wherein in the view map correction mode,
    when a first test image viewable from a first orthoscopic viewing zone is transferred to the panel and then a first view selection signal is received from the system, the control unit temporarily stores the position coordinates, being coordinates at a time when the first view selection signal is received, as first position coordinates,
    when the first view selection signals is received, the control unit transfers a second test image to the panel, and then when a second view selection signal is received from the system, the control unit temporarily stores the position coordinates, being coordinates at a time when the second view selection signal is received, as second position coordinates, and
    the control unit generates the view map with the first and second position coordinates.

5. The 3D image display device of claim 4, wherein when a view displayed by the panel comprises first to nth views, the first test image is a first image which is viewable from a first orthoscopic zone in one side direction with respect to a center coordinate, being a reference coordinate among X coordinates of the images collected by the image collector, and the second test image is a second image which is viewable from a first orthoscopic zone in the other side direction with respect to the center coordinate.

6. The 3D image display device of claim 5, wherein the first and second test images are the same type of images or different types of images.

7. The 3D image display device of claim 5, wherein the first and second test images are images, which are displayed on the panel with the first view, among a plurality of images displayed with the first to nth views.

8. The 3D image display device of claim 6, wherein the control unit calculates coordinates information of a plurality of orthoscopic zones which are formed between the first and second position coordinates by using the first and second position coordinates and the number of views, and generates the view map with the coordinates information.

9. The 3D image display device of claim 8, wherein the view map comprises: coordinates information of a plurality of pseudoscopic zones which are formed between the first and second position coordinates; and coordinates information of a plurality of orthoscopic zones and pseudoscopic zones which are formed outside the first and second position coordinates.

10. The 3D image display device of claim 9, further comprising:
a lookup table storing the view map; and
a test image storage unit storing the first and second test images.

11. The 3D image display device of claim 10, wherein,
the lookup table stores information on at least one of: the number of views displayed on the panel, a size of the panel, a pitch of each pixel formed in the panel, and characteristic of the barrier panel, and
the control unit uses the information integratedly when generating the view map.

12. The 3D image display device of claim 3, wherein when the image collector is configured with an infrared sensor, the position determination unit scans the infrared sensor in a predetermined direction to calculate an X coordinate of the user, and analyzes a reflection time of infrared light outputted from the infrared sensor to calculate a Y coordinate of the user, thereby extracting the position coordinates.

13. The 3D image display device of claim 3, wherein when the image collector is configured with a camera, the position determination unit calculates an X coordinate of the user in a face detecting scheme, and calculates a Y coordinate of the user on the basis of disparity information or depth information which are supplied from the camera, thereby extracting the position coordinates.

14. The 3D image display device of claim 3, further comprising a barrier driver receiving the barrier control signal to drive the barrier panel,
wherein the barrier driver changes an application scheme, application order, or levels of a plurality of voltages applied to the barrier panel to switch the light transmitting area and the light blocking area, according to the barrier control signal.

15. A driving method of a Three-Dimensional (3D) image display device, the driving method comprising:
outputting a first test image, generated with a first view, onto a panel, receiving a first view selection signal from a system, and extracting first position coordinates of a user in the middle of receiving the first view selection signal, when a view map correction mode is selected by the user;
outputting a second test image, generated with the first view, onto a panel, receiving a second view selection signal from the system, and extracting second position coordinates of the user in the middle of receiving the second view selection signal, when the first view selection signal is received;
generating a view map with the first and second position coordinates to store the view map, the view map comprising coordinates of a plurality of orthoscopic zones which are formed with a 3D image comprising at least two or more views;
determining whether a current position coordinates correspond to an orthoscopic zone by using the current position coordinates of the user and the view map set and stored in the view map correction mode that is selected by the user, when a 3D image viewing mode is selected; and
in the 3D image viewing mode, when a determined result shows that the current position coordinates do not correspond to an orthoscopic zone that is a comfortable zone for viewing the 3D image, controlling a barrier panel so that the current position coordinates correspond to the orthoscopic zone without a change in a physical position of the user,
wherein the current position coordinates is extracted from images which are collected by an image collector.

16. The driving method of claim 15, wherein the receiving of the first view selection signal comprises:
receiving a view map correction request signal from the system;
outputting the first test image onto the panel, the first test image being generated with a first view of the at least two or more views;
driving the image collector to collect images of an object the user; and
extracting the first position coordinates from the collected images, when the first view map selection signal is received from the system.

17. The driving method of claim 15, wherein the receiving of the second view selection signal comprises:
outputting the second test image onto the panel when the first view selection signal is received, the second test image being generated with the first view; and
extracting the second position coordinates from the collected images, when the second view map selection signal is received from the system.

18. The driving method of claim 15, wherein the generating of the view map comprises:
extracting an X coordinate of a center view with the first and second position coordinates, the center view being generated with 3D image;
extracting a Y coordinate of the center view from the images collected by the image collector; and
generating and storing the view map by using the coordinates of the center view and at least one of: the number of views; a size of the panel; a pitch of each pixel formed in the panel; and characteristic of the barrier panel, the view map comprising coordinates of a plurality of orthoscopic zones which are formed with the 3D image.

19. The driving method of claim 18, wherein,
when the image collector is configured with an infrared sensor, the extracting of X coordinate uses an X-axis coordinate of the first position coordinates and an X-axis coordinate of the second position coordinates which are calculated by scanning the infrared sensor, and when the image collector is configured with a camera, the extracting of X coordinate uses an X-axis coordinate of the first position coordinates and an X-axis coordinate of the second position coordinates which are extracted by a face detecting scheme.

20. The driving method of claim 18, wherein, when the image collector is configured with an infrared sensor, the extracting of Y coordinate uses a Y-axis coordinate of the user which is calculated by analyzing a reflection time of infrared light outputted from the infrared sensor, and when the image collector is configured with a camera, the extracting of Y coordinate uses a Y coordinate of the user which is calculated with disparity information or depth information supplied from the camera.

21. The driving method of claim 15, wherein the controlling of the barrier panel comprises:

extracting current position coordinates of the user from the images which are collected by the image collector, when a 3D image viewing mode;

comparing the current position coordinates with the view map to determine whether the current position coordinates correspond to an orthoscopic zone;

calculating an amount of change in a light transmitting area and light blocking area of the barrier panel which allows the current position coordinates correspond to the orthoscopic zone, by using the current position coordinates and the view map, when the current position coordinates do not correspond to the orthoscopic zone as a determined result;

generating a barrier control signal for controlling the barrier panel to transfer the barrier control signal to a barrier driver, according to the amount of change; and controlling, by the barrier driver, the barrier panel according to the barrier control signal to switch the light transmitting area and the light blocking area by the amount of change.

* * * * *